May 7, 1929.  W. J. McCANN  1,711,740
CONVEYER TABLE
Filed Dec. 7, 1927  3 Sheets-Sheet 1
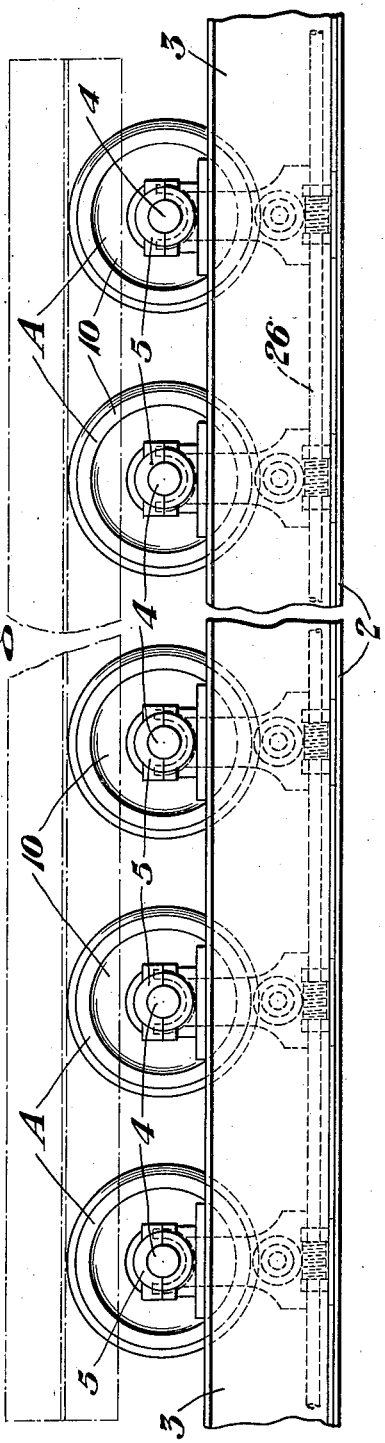
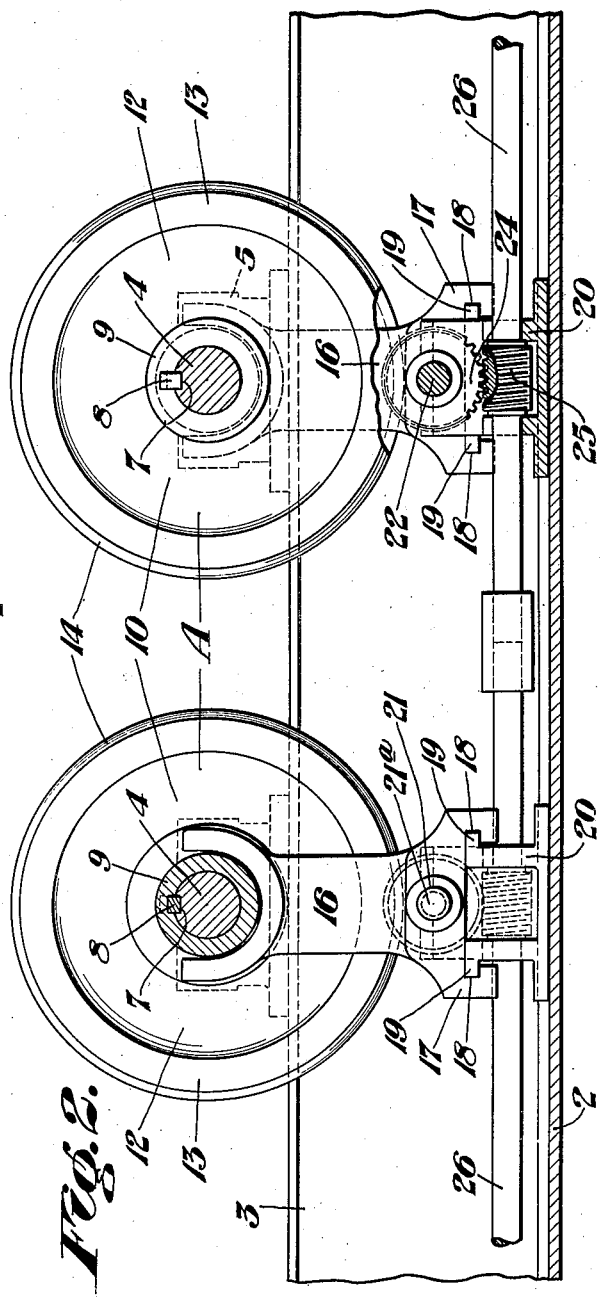
Inventor:
WILLIAM J. McCANN,
by: D. Anthony Usina
his Attorney.

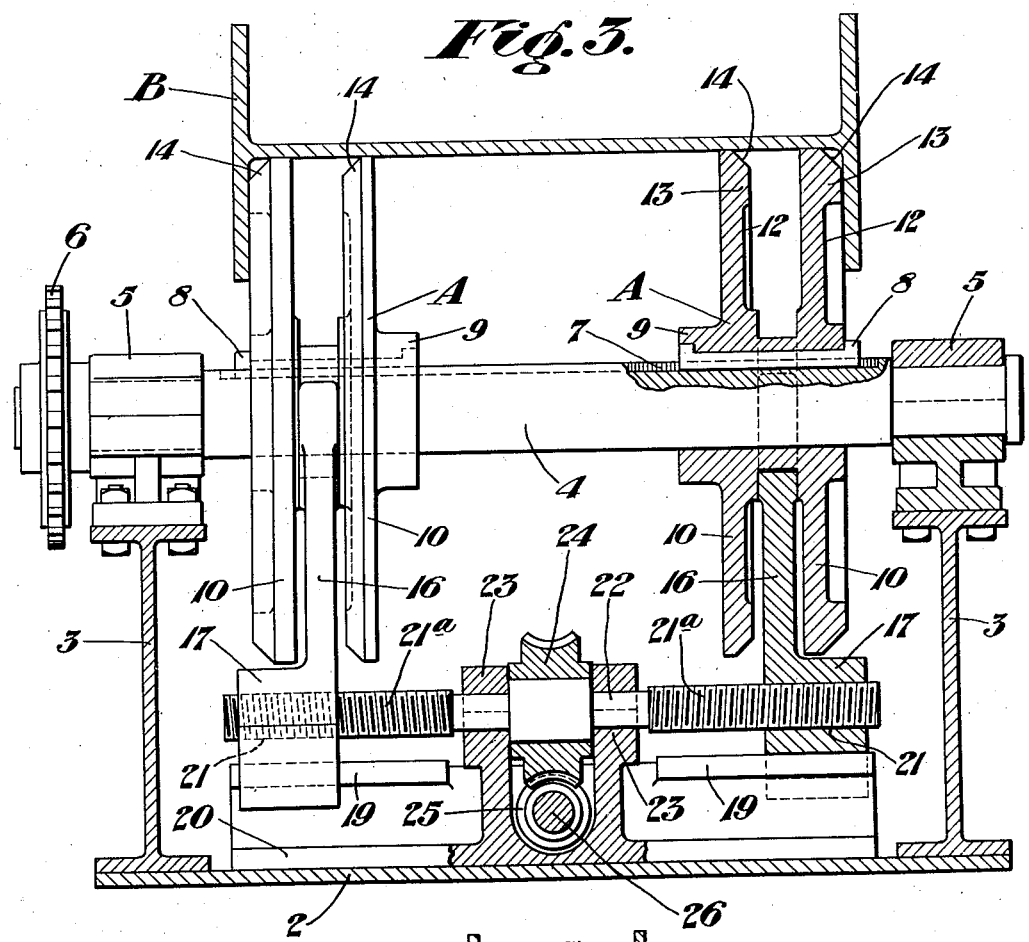
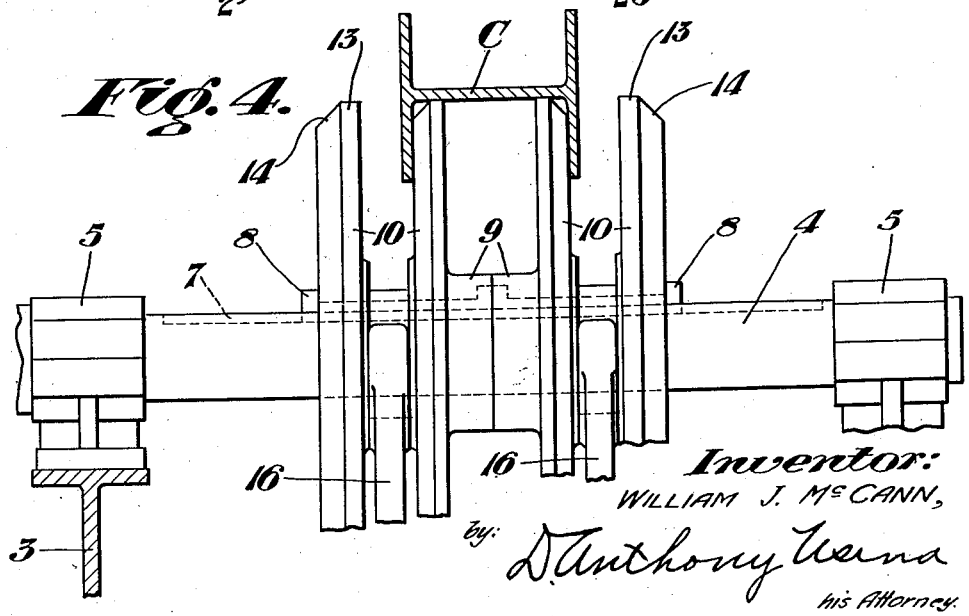

May 7, 1929. W. J. McCANN 1,711,740
CONVEYER TABLE
Filed Dec. 7, 1927    3 Sheets-Sheet 3
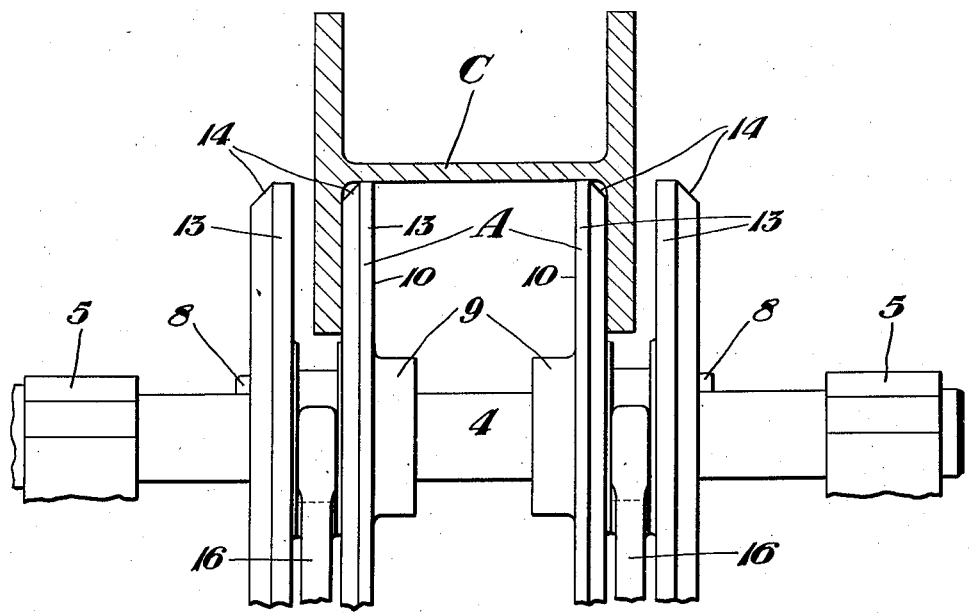
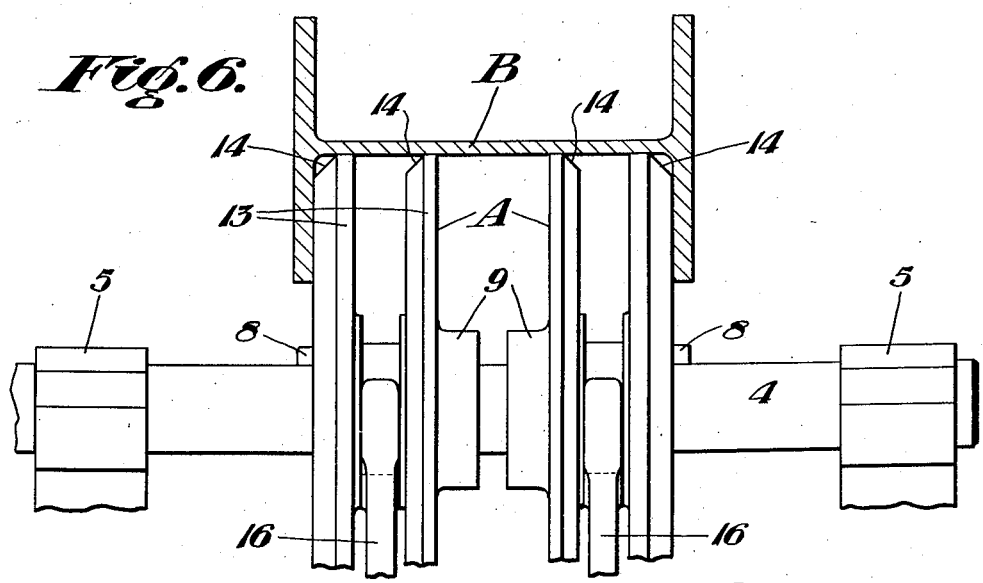
Inventor:
WILLIAM J. McCANN,
by D. Anthony Usina
his Attorney.

Patented May 7, 1929.

1,711,740

UNITED STATES PATENT OFFICE.

WILLIAM J. McCANN, OF SEWICKLEY, PENNSYLVANIA.

CONVEYER TABLE.

Application filed December 7, 1927. Serial No. 238,347.

This invention relates to conveying tables and, while not limited thereto, relates more particularly to conveying tables for conveying flanged shapes such as rolled metal I and H-beams and the like, and has for its object the provision of a table of this class having adjustable rollers adapted to be adjusted to fit between the flanges of various sizes of beams and to guide said beams while they are being conveyed along the table.

The table of this invention may be used wherever it is desirable to convey beams. However, it is primarily designed to convey beams to and from the various metal working machines used in a fabricating shop, in which cases it is of utmost importance that the beams be conveyed in a straight path.

In the drawings—

Figure 1 is a longitudinal elevation of a table constructed in accordance with this invention.

Figure 2 is a longitudinal sectional elevation through a portion of a table constructed in accordance with this invention.

Figure 3 is a transverse sectional elevation.

Figures 4, 5 and 6 are fragmentary transverse sectional elevations showing the rollers adjusted to convey various sizes of beams.

Referring more particularly to the drawings the numeral 2 designates the base or bed-plate of the table on which are supported the side members or beams 3.

A plurality of conveyer roller shafts 4 are arranged at spaced intervals transversely of the table and are journaled in bearings 5 on the side members 3. The shafts 4 have one end projecting beyond the bearings 5 a sufficient distance to support a sprocket or other drive element 6 to which power is delivered to drive or rotate the shafts.

The shafts 4 are each provided with a longitudinally extending slot or keyway 7, and a pair of conveying roller members A are mounted on each of the shafts 4 and provided with keys 8 which are engaged in the keyway 7. The keys 8 permit the roller members A to slide longitudinally relative to the shafts 4 and at the same time compel the rollers to rotate with the shafts.

Each of the roller members A comprises a hub portion 9 and a pair of spaced disks 10 formed integral with the hub.

The disks 10 have their outside faces cut away, as at 12, so as to form annular shoulders 13 adapted to contact with the inside faces of the flanges of the beams being conveyed. The peripheral faces of the disks are each beveled along their outer edges, as at 14, so as to form a clearance for the fillets formed at the juncture of the beam flanges and web.

Shifting yoke arms 16 extend upwardly between the disks 10 of each roller and have their upper yoked ends fitted around the hub portions 9 of the rollers. The lower ends of the yoke arms 16 are enlarged, as at 17, and undercut, as at 18, so as to have a sliding fit with the flanged head 19 of a base member 20.

The enlarged ends 17 of the yoke arms 16 are provided with threaded apertures 21 to receive the threaded ends 21ª of a right and left-hand threaded shaft 22 journaled in bearings 23 on the base member 20. Each of the shafts 22 is provided with a worm-wheel 24 which is meshed with a worm 25 on a worm-shaft 26 extending longitudinally of the table and journaled in the base members 20. The shaft 26 may be rotated in any desired manner, either by hand or power.

In operation, when it is desired to convey relatively large beams, such as the beams B shown in Figures 3 and 6, the rollers A will be adjusted longitudinally of the shafts 4 so that the outer side faces of the outer disks 10 will fit snugly within the flanges of the beam. The beam will thus be supported by the four disks on each shaft so as to provide a materially greater traction and support than if a single disk were used.

When the smaller beam sections C, such as shown in Figures 4 and 5, are to be conveyed, the rollers A will be adjusted longitudinally of the shafts 4 so that the outer side faces of the inner disks 10 will fit snugly within the flanges of the beam. The lighter or smaller beam sections do not need the amount of support that the larger beam sections need. Therefore, the single disks are sufficient, and also by adjusting the rollers so that the inner disks alone are used, a lesser movement of the rollers is necessary.

It will be understood, however, that either one or both disks may be used to convey any or all sizes of beams and if desired, the rollers may be provided with a single disk instead of the two disks as shown.

By cutting away the outside faces of the disks 10, as at 12, the contact area between the side faces of the disks and the beam flanges is greatly reduced so as to reduce the friction and wear.

When it is desired to adjust the rollers A to any of the several sizes of beams, it is only necessary to rotate the worm-shaft 26 so as to cause the worm-gears 25 to rotate the worm-wheels 24 and shafts 22. The right and left-hand threaded ends 21ª of the shaft 22 will cause the shifting arms 16 to move simultaneously toward or away from each other when the shaft 22 is rotated in accordance with the direction of rotation of said shaft, and, due to the connection of the shifting arms with the rollers A, the rollers will be compelled to move with the shifting arms.

The worm and worm-wheel drives for the shafts 22 serve as locks to prevent the movement of the shafts 22 unless the worm-shaft 26 is rotated.

Due to the fact that the rollers A are all simultaneously adjusted on the shafts 4, all the rollers A will always be in alinement and, therefore, when a beam or other section is mounted over the disks 10, as shown, it will be guided in a perfectly straight path along the table. This feature is especially important when conveying beams or shapes to different metal working machines.

While I have shown and described one specific form of my invention it will be understood that I do not wish to be limited thereto since various modifications may be made without departing from the scope thereof, as defined in the appended claims.

I claim—

1. A roller table for conveying flanged shapes and the like comprising a table frame, a plurality of shafts arranged transversely of and journaled on said frame, at least two disk rollers mounted on each of said shafts, said rollers being rotatable with and adjustable longitudinally relative to said shafts, means for rotating said shafts, and means for adjusting said rollers longitudinally relative to said shafts.

2. A roller table for conveying flanged shapes and the like comprising a table frame, a plurality of shafts arranged transversely of and journaled on said frame, at least two disk rollers slidably keyed on each of said shafts so as to be rotatable with and adjustable longitudinally relative to said shafts, and mechanical means for sliding said disk rollers longitudinally relative to said shafts.

3. A roller table for conveying flanged shapes and the like comprising a table frame, a plurality of shafts arranged transversely of and journaled on said frame, at least two disk rollers slidably keyed on each of said shafts so as to be rotatable with and adjustable longitudinally relative to said shafts, and mechanical means for simultaneously sliding said disk rollers in opposite directions longitudinally relative to said shafts.

4. A roller table for conveying flanged shapes and the like comprising a table frame, a plurality of shafts arranged transversely of and journaled on said frame, at least two disk rollers slidably keyed on each of said shafts so as to be rotatable with and adjustable longitudinally relative to said shafts, means for rotating at least some of said shafts, and mechanical means including a worm and worm-wheel for adjusting the rollers on each of said shafts longitudinally relative to said shafts.

5. A roller table for conveying flanged shapes and the like comprising a table frame, a plurality of shafts arranged transversely of and journaled on said frame, at least two disk rollers mounted on each of said shafts, said rollers being rotatable with and adjustable longitudinally relative to said shafts, and mechanical means for adjusting said rollers longitudinally relative to said shafts, said means including shifting arms connected to each of said rollers, said shifting arms connected to the rollers on each of said shafts having a threaded engagement with oppositely threaded portions of a threaded shaft, and a worm and worm-wheel drive connection for said threaded shafts.

6. A roller table for conveying flanged shapes and the like comprising a table frame, a plurality of shafts arranged transversely of and journaled on said frame, at least two disk roller members mounted on each of said shafts, said roller members each comprising a hub portion and a pair of spaced disks, said roller members being each rotatable with and adjustable longitudinally relative to said shafts.

7. A roller table for conveying flanged shapes and the like comprising a table frame, a plurality of shafts arranged transversely of and journaled on said frame, at least two disk roller members slidably keyed on each of said shafts so as to be rotatable with and adjustable longitudinally relative to said shafts, shifting forks having their upper ends engaged with the hub portions of said roller members between said disks, a right and left-hand threaded shaft journaled below each of said first named shafts, said shifting forks having their lower ends threaded on said last named shafts, a worm-wheel secured on each of said threaded shafts, and a worm-shaft journaled longitudinally of said table and provided with worm-gears meshed with said worm-wheels on said threaded shafts whereby rotation of said worm-shaft will simultaneously rotate all of said threaded shafts so as to simultaneously shift all of said rollers longitudinally of said first named shafts.

In testimony whereof, I have hereunto set my hand.

WILLIAM J. McCANN.